Aug. 9, 1932. W. S. MARVIN Re. 18,564

ELECTRIC PERCOLATOR

Original Filed Sept. 4, 1928 2 Sheets-Sheet 1

Inventor
Walter S. Marvin, deceased
by The Metal Ware Corporation, Assignee
By
Attorneys Aug. 9, 1932. W. S. MARVIN Re. 18,564

ELECTRIC PERCOLATOR

Original Filed Sept. 4, 1928 2 Sheets-Sheet 2

Inventor
Walter S. Marvin, deceased
by The Metal Ware Corporation, Assignee

By Young & Young
Attorneys

Reissued Aug. 9, 1932 Re. 18,564

UNITED STATES PATENT OFFICE

WALTER S. MARVIN, DECEASED, LATE OF TWO RIVERS, WISCONSIN, BY THE METAL WARE CORPORATION, OF TWO RIVERS, WISCONSIN, ASSIGNEE

ELECTRIC PERCOLATOR

Original No. 1,810,490, dated June 16, 1931, Serial No. 303,892, filed September 4, 1928. Application for reissue filed June 9, 1932. Serial No. 616,289.

This invention relates to electric percolators. Objects of this invention are to provide a novel form of heater of the immersion type for an electric percolator, which is so constructed that the heat is directly conducted from the heating element to the shell of the heater, and in which novel means are provided for rigidly locking the heater in place and simultaneously locking the base to the pot or body portion of the percolator.

Further objects are to provide a novel construction for insulating the outgoing leads from the heater at the point where they pass through the bottom shell below the heater, so that bare conductor strips may be used without any danger of contact with the metal portions of the apparatus.

An embodiment of the invention is shown in the accompanying drawings, in which.

Figure 1:
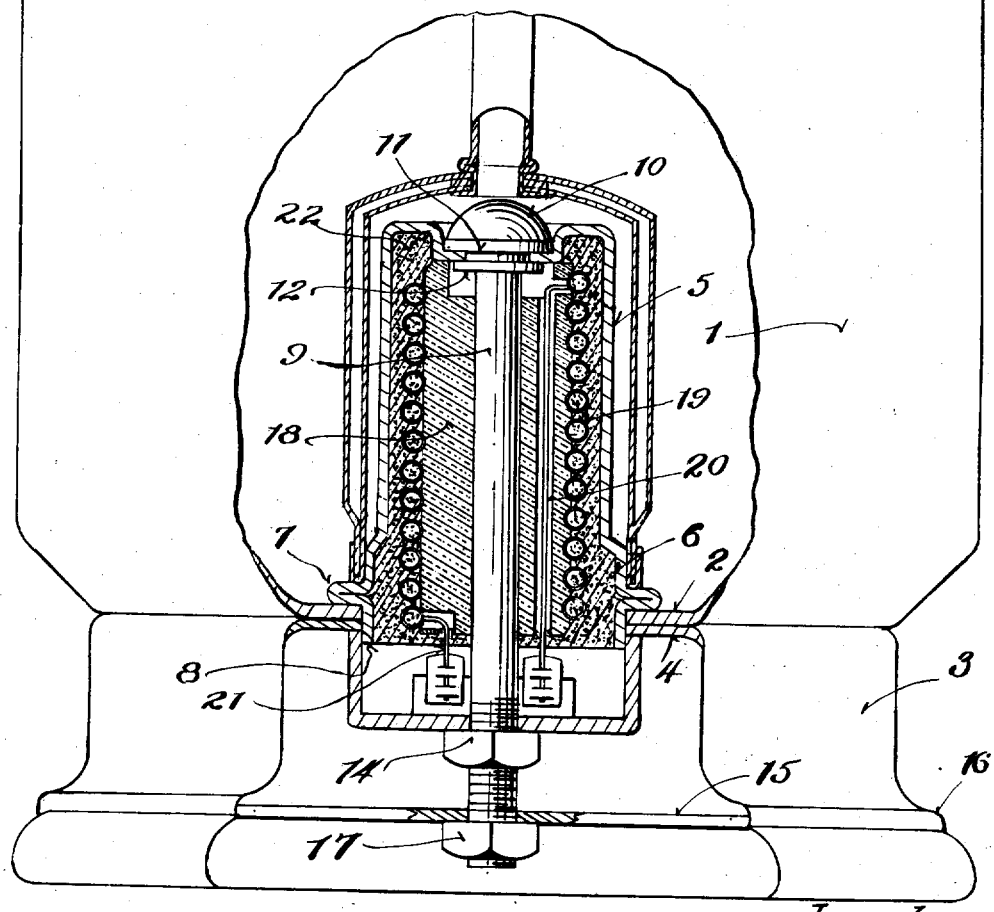
Figure 1 is a fragmentary side elevation of a percolator, showing the heater in section, and with parts broken away.

Referring to the drawings, it will be seen that the body portion, or pot, is indicated by the reference character 1, and that this pot is provided with a bottom 2. The base 3 is provided with a transverse wall 4. The bottom and transverse walls are provided with alining apertures.

The immersion type heater consists of an inverted cup 5 which may be slightly swelled or enlarged, as at the point 6. It is provided with an outwardly projecting flange 7 which rests upon the bottom 2 of the pot. Further it is provided with a downwardly projecting extension 8 which passes through the alining apertures. A bolt 9 is rigidly carried by the top of the cup. The bolt is preferably provided with a head 10 and with a small channel 11 between such head and a flange 12. Initially the flange 12 is turned downwardly and the bolt is slipped into place. Thereafter the flange is swaged, or turned up, so as to lock the bolt head rigidly to the top of the inverted cup 5. The bolt extends downwardly and passes through the inverted cap 13, and is provided with a nut 14 which is screwed tightly against the under side of the cap. This cap is of greater diameter than the extension 8 of the cup, and consequently telescopically receives the extension and bears against the under side of the transverse wall 4 of the base.

Thus the base and the pot are locked rigidly together and also the heater is held rigidly in place. A steel shield plate 15 is held by the bolt in contact with a shouldered portion 16 of the base. It is locked in place by means of the nut 17.

The heater is provided with a heat resisting core 18 which is preferably spirally grooved and which receives the spiralled or coiled heating element 19. One end of the heating element is connected to the conductor 20 which leads downwardly from the upper end of the core 18 as indicated in Figure 1. The other end of the heating element is connected to the conductor 21, which is adjacent the lower portion of the core 18 and which extends through the recess and downwardly, as shown.

Preferably the conductors 20 and 21 are extensions of the heating element, although obviously they may be additional members welded or otherwise secured to the heating element.

The space between the core and the inverted cup 5 is filled by an insulating filling 22 which is preferably put in while in plastic condition and allowed to harden in place. Thus the heat from the heating element is directly conducted through the filling to the inverted cup 5. In addition to this, the filling rigidly holds the heating element in place and prevents sagging or displacement thereof.

Figure 2:
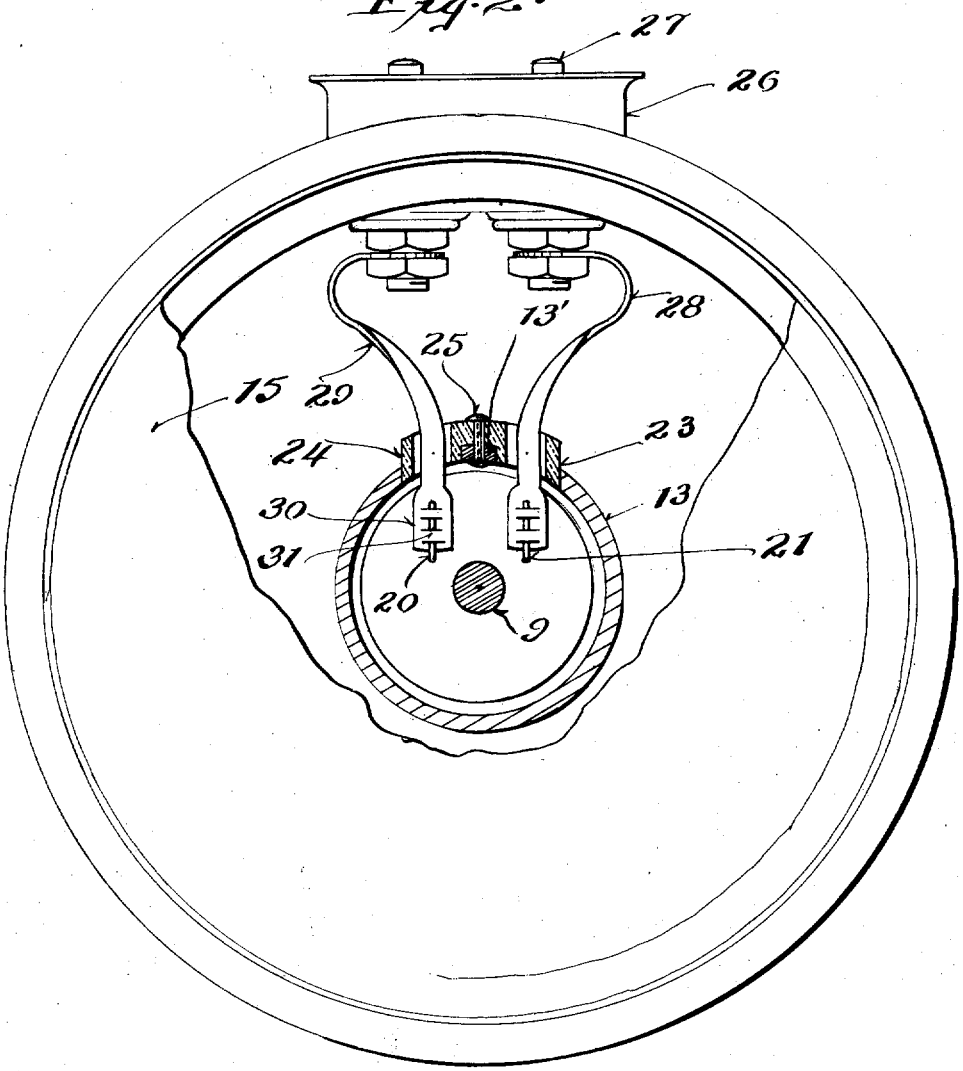
Figure 2 is a bottom view of the percolator with the bottom shield plate broken away and with the bottom cap and associated parts in section.

The cap 13 is provided with a pair of apertures 23 (see Figure 2) which are separated by means of the portion 13′ of the cap which is left intact. An insulating bushing 24 is placed, as shown in Figure 2, in contact with the shell and with its inwardly projecting apertured arms extend into the openings 23. This insulating bushing is held in place by means of a rivet 25 which is passed through the member 13′ and riveted in place.

The base is provided with a shell or cuplike receptacle 26 for the reception of a plug. A pair of prongs 27 are carried by the base within this cuplike receptacle, and are insulated from the base. A pair of metal strips 28 and 29 are secured by means of nuts to the inner ends of the prongs, as shown in Figure 2, and extend through the openings in the insulating bushing 24. Their inner ends are provided with enlarged portions 30 which are transversely slotted or provided with a series of transverse straps 31.

The conductors 20 and 21 are slipped between the successive straps, as shown in Figures 1 and 2, and thus are rigidly mechanically connected and electrically connected to the enlarged portions 30 of the straps 28 and 29. Preferably these enlarged portions are bent at right angles, as shown in Figures 1 and 2, to thus provide extensive bearing surface in contact with the conductors 20 and 21 and also to more firmly lock such conductors in place against inadvertent withdrawal.

By providing the bushing 24 and by rigidly locking the straps 28 and 29 to the inner ends of the prongs, it is possible to use bare metallic straps without any insulation whatsoever. This has been found to be a material improvement over the usual construction as there is no possible chance of charring the insulating covering for these conductors as they are free from such covering. Further it materially simplifies the construction and provides a reliable, cheap, and easily produced means of attaching the heater to the prongs.

It will be seen that a novel form of electric immersion type of heater has been provided by this invention, which may be very easily constructed, which is easy to assemble, and which permits the ready replacement of one heating element by a new heating element whenever burning out through extensive use occurs. Further it may be appreciated that by having the heat directly connected from the heating element through the filling 22, the chance of burning out is very much reduced.

What is claimed is:—

1. In an electric percolator, the combination of a pot having a bottom, a base having a transverse wall, said bottom and said wall having aligning apertures, an electric heating unit cup mounted on said bottom in said pot and having an extension projecting through the aligning apertures, an inverted cap bearing on the underside of said transverse wall, a shield plate carried by the base and spaced from the transverse wall of the base, a bolt carried by the upper end of the heating unit cup and extending downwardly through the cap and shield plate, a nut carried by the bolt adjacent its outer end and locking said cap in place, and a second nut on the outer end of said bolt engaging the outer face of the shield plate to retain the same in position in the base.

2. In an electric percolator, the combination of a pot having a bottom, a base having a transverse wall, said bottom and said wall having aligning apertures, an inverted cup within the pot, an annular flange on the cup resting upon the bottom of the pot and an extension projecting through the aligning apertures, said cup having an opening in its upper end, a bolt extending through the opening in the cup with a head engaging the upper end thereof, an annular flange on the bolt adapted to engage the underside of the upper end of the cup for retaining the bolt against movement with respect to the cup, an inverted cap bearing on the underside of the transverse wall and having an opening through which the bolt extends, a nut on the bolt for locking said cap in place, and a heating element mounted on the bolt within the cup with an insulating filling between the cup and the heating element, and conductors leading from the heating element out through the inverted cap.

3. In an electric percolator, the combination of a pot having a bottom, a base having a transverse wall, said bottom and said wall having aligning apertures, an inverted cup within the pot, an annular flange on the cup resting on the bottom of the pot, an extension on the cup downwardly of the flange and projecting through the said apertures beyond the lower face of said wall, a bolt extending through the cup with its headed end engaged with the cup, a cap mounted on the bolt and engaged over the extension of the cup and contacting the lower face of the wall, and a nut adjustable on the bolt and adapted to engage the cap for retaining the bottom of the pot and said transverse wall on the base in intimate contacting relation between the cup flange and the cap.

4. In an electric percolator, the combination, of a pot having a bottom wall, a base having a transverse top wall, said walls having alining apertures, an emersion heater cup having an outer flange resting upon the bottom wall and having a downwardly extending portion passing through said alining apertures, a bolt secured to the top of said cup and having a downwardly extending threaded portion, a bottom cap carried by said bolt, a nut screwed upon said bolt and forcing said cap into contact with the under side of said transverse wall, a refractory core surrounding said bolt, a heating element carried by said core, and an insulating packing filling the space between said core and said cup, whereby said emersion heater is held rigidly in place and whereby heat is conducted directly from said heating element to said cup.

5. In an electric heating device, the combination of a pot having a wall provided with an opening, a cup mounted on said wall within said pot and having a peripheral flange engaging said wall and an apron on its outer end projecting through said opening, a retaining member positioned on the outside of the wall and opposing said flange, a bolt extending axially through the cup and connected with the inner end of said cup and extending outwardly through the cup and said retaining member, and means on said bolt for engaging said retaining member to force the same toward said peripheral flange, and an electrical heating element positioned within said cup around the bolt and engaging the outer wall of the cup.

6. In an electric heating device, the combination of a pot having a bottom wall provided with an opening, a supporting base secured to said pot, an inverted cup mounted on said bottom wall within said pot and having a peripheral flange and a depending apron projecting through said bottom opening, a retaining member positioned below the bottom of said cup and opposing said flange, a bolt connected with the upper end of the cup and extending downwardly through the cup and the opening and said retaining member, means on said bolt for engaging said retaining member to force the same toward the peripheral flange, and an electrical heating element within said cup and engaging the outer wall thereof.

7. In an electric heating device, the combination of a pot having a bottom wall provided with an opening, a supporting base secured to said pot, an inverted cup disposed within said pot having a peripheral flange snugly engaging the inner face of the bottom and a depending apron projecting through the opening and snugly engaging the wall thereof, a cap positioned in said base opposing said flange snugly receiving the apron, a bolt connected with the upper end of the cup and extending axially therethrough and through the opening and cap, means on said bolt for engaging the cap to force the same toward the peripheral flange, and an electrical heating element positioned within the cup around the bolt and engaging the outer wall of the cup.

8. In an electric heating device, the combination of a pot having a bottom wall provided with an opening, a supporting base having a top engaging the bottom wall and a shoulder spaced from said top, an inverted cup mounted on said bottom wall within said pot and having a peripheral flange snugly engaging the inner face of the bottom wall and a depending apron projecting through the opening and snugly engaging the wall thereof, a retaining cap positioned within the base and opposing said flange and snugly receiving the apron, a bolt carried by the upper end of the cup and extending axially through the cup, the opening and the cap, means on said bolt for engaging said cap to force the same toward said flange, a shield plate for the base engaging the shoulder, the bolt extending through the plate, means on the bolt for urging the shield plate on the shoulder, and an electrical heating element positioned within said cup and engaging the outer wall thereof.

9. In an electric heating device, the combination of a pot having a bottom wall provided with an opening, a supporting base secured to said pot, an inverted cup mounted on said bottom wall within said pot and having a peripheral flange and a depending apron projecting through said bottom opening, a retaining member positioned below the bottom of said cup and opposing said flange, a shield plate for the base, a bolt connected with the upper end of the cup and extending downwardly through the cup, the opening, said retaining member and through the shield plate, means on the bolt for engaging the retaining member and plate for urging the same respectively toward the peripheral flange and the base, and an electrical heating element within said cup and engaging the outer wall thereof.

10. In an electric heating device, the combination of a vessel having a bottom wall provided with an opening, a supporting base engaging the vessel, an inverted cup arranged within the vessel having a peripheral flange engaging the bottom wall around the opening and a depending apron extending through the opening, a retaining member positioned below the bottom wall and opposing said flange, a shield plate for the base, a bolt carried by the cup and extending downwardly through the cup, retaining member and shield plate, means on the bolt engaging the retaining member for urging the same toward the flange, means on the bolt engaging the shield plate for holding the same in position, and an electrical heating element within said cup.

11. In an electrical heating device, the combination with a receptacle having a wall provided with an opening, a cup engaging said wall about the opening, a bolt connected with the upper end of the cup and extending axially through the cup and through the opening in said wall of the receptacle, an electrical heating element in the cup about the bolt and in close contact with the inner face of the cup, and means on the bolt outward of said wall for drawing the cup into intimate engagement with the inner face of the wall.

In testimony that I claim the foregoing I have hereunto set my hand at Two Rivers, in the County of Manitowoc, and State of Wisconsin.

THE METAL WARE CORPORATION,
*Assignee of Walter S. Marvin, Deceased.*
By ELMER E. DRUMM,
*President.*